(12) United States Patent
Hyeon (10) Patent No.: US 10,460,650 B2
(45) Date of Patent: Oct. 29, 2019

(54) DISPLAY DEVICE, DRIVING METHOD THEREOF, AND NON-TRANSITORY COMPUTER READABLE RECORDING MEDIUM

(71) Applicant: SAMSUNG ELECTRONICS CO., LTD., Suwon-si (KR)

(72) Inventor: Byeong-cheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/672,453

(22) Filed: Aug. 9, 2017

(65) Prior Publication Data

US 2018/0158399 A1    Jun. 7, 2018

(30) Foreign Application Priority Data

Dec. 1, 2016  (KR) .................. 10-2016-0163036

(51) Int. Cl.
*G09G 3/32*  (2016.01)
*G09G 3/36*  (2006.01)
*H04N 13/398*  (2018.01)

(52) U.S. Cl.
CPC ............. *G09G 3/32* (2013.01); *G09G 3/3648* (2013.01); *G09G 3/3677* (2013.01); *G09G 2310/0213* (2013.01); *G09G 2310/0216* (2013.01); *G09G 2320/0233* (2013.01); *G09G 2320/0247* (2013.01); *G09G 2330/021* (2013.01); *G09G 2340/16* (2013.01); *H04N 13/398* (2018.05)

(58) Field of Classification Search
CPC ...... G09G 3/32; G09G 3/3648; G09G 3/3677; G09G 2310/0213; G09G 2310/0216; G09G 2320/0233; G09G 2320/0247; G09G 2340/16; H04N 13/398
See application file for complete search history.

(56) References Cited

U.S. PATENT DOCUMENTS

| | | | | |
|---|---|---|---|---|
| 6,727,875 | B1 * | 4/2004 | Mikami | G09G 3/3648 345/92 |
| 7,847,780 | B2 | 12/2010 | Chang | |
| 9,084,319 | B2 | 7/2015 | Sullivan et al. | |
| 10,073,551 | B2 * | 9/2018 | Kubota | G06F 3/0414 |
| 2002/0044782 | A1 * | 4/2002 | Kota | G03B 1/00 396/661 |
| 2002/0196220 | A1 * | 12/2002 | Sato | G09G 3/342 345/87 |
| 2004/0001054 | A1 * | 1/2004 | Nitta | G09G 3/3648 345/204 |

(Continued)

FOREIGN PATENT DOCUMENTS

| | | |
|---|---|---|
| JP | 3449467 B2 | 9/2003 |
| JP | 4626171 B2 | 2/2011 |

(Continued)

*Primary Examiner* — Michael J Eurice
(74) *Attorney, Agent, or Firm* — Sughrue Mion, PLLC (57) ABSTRACT

A display device includes a display including a plurality of LED lines, a scan driver for successively supplying a power to the plurality of LED lines, and a processor for controlling the scan driver to successively supply the power to the plurality of LED lines in a repeated manner for each of a plurality of sub-periods that form a scan period and changing a turn-on order of the plurality of LED lines for each of the plurality of sub-periods.

13 Claims, 9 Drawing Sheets

(56) References Cited

U.S. PATENT DOCUMENTS

| | | | |
|---|---|---|---|
| 2004/0155851 A1* | 8/2004 | Morii | G09G 3/3659 345/99 |
| 2004/0227774 A1* | 11/2004 | Matsumoto | G09G 3/20 345/690 |
| 2004/0239604 A1* | 12/2004 | Watsuda | G09G 3/3677 345/95 |
| 2005/0062710 A1* | 3/2005 | Kasai | G09G 3/3225 345/99 |
| 2005/0162360 A1* | 7/2005 | Ishihara | G09G 3/2011 345/89 |
| 2007/0008277 A1* | 1/2007 | Okumura | G09G 3/3688 345/104 |
| 2007/0030219 A1* | 2/2007 | Park | G09G 3/3233 345/76 |
| 2007/0040765 A1* | 2/2007 | Iwami | G09G 3/2932 345/63 |
| 2008/0224984 A1* | 9/2008 | Chang | G09G 3/3614 345/100 |
| 2008/0309599 A1* | 12/2008 | Tsuda | G09G 3/3688 345/88 |
| 2009/0243995 A1* | 10/2009 | Kimura | G09G 3/342 345/102 |
| 2009/0294163 A1* | 12/2009 | Yamamoto | G09G 3/3233 174/261 |
| 2010/0238156 A1* | 9/2010 | Iwamoto | G09G 3/3648 345/213 |
| 2011/0062874 A1* | 3/2011 | Knapp | H04L 12/43 315/158 |
| 2011/0285757 A1* | 11/2011 | Cummings | G09G 3/2003 345/690 |
| 2012/0081347 A1* | 4/2012 | Kim | G09G 3/3648 345/211 |
| 2012/0262384 A1* | 10/2012 | Kim | G06F 3/0412 345/173 |
| 2013/0181969 A1* | 7/2013 | Kishi | G09G 3/3233 345/212 |
| 2014/0043223 A1* | 2/2014 | English | G09G 3/3433 345/156 |
| 2014/0198094 A1* | 7/2014 | Yamazaki | G09G 3/344 345/212 |
| 2014/0320478 A1* | 10/2014 | Oh | G09G 3/00 345/212 |
| 2015/0015556 A1* | 1/2015 | Pappas | H01L 27/1225 345/211 |
| 2015/0070343 A1* | 3/2015 | Lee | G09G 3/20 345/212 |
| 2015/0194110 A1* | 7/2015 | Park | G09G 3/3614 345/213 |
| 2016/0042708 A1* | 2/2016 | Wang | G09G 3/32 345/214 |
| 2016/0078800 A1* | 3/2016 | Ha | G09G 3/32 315/209 R |
| 2016/0078802 A1 | 3/2016 | Liang et al. | |
| 2016/0172423 A1* | 6/2016 | Nendai | H01L 27/3246 257/40 |
| 2017/0039931 A1* | 2/2017 | Kubota | G09G 5/363 |
| 2017/0115808 A1* | 4/2017 | Cho | G06F 3/0412 |
| 2017/0270866 A1* | 9/2017 | Asano | G09G 3/3258 |
| 2018/0004345 A1* | 1/2018 | Shin | G02F 1/13338 |
| 2018/0182307 A1* | 6/2018 | Tseng | G09G 3/3413 |

FOREIGN PATENT DOCUMENTS

| | | | |
|---|---|---|---|
| JP | 4645494 | B2 | 3/2011 |
| JP | 4831988 | B2 | 12/2011 |

* cited by examiner

DISPLAY DEVICE, DRIVING METHOD THEREOF, AND NON-TRANSITORY COMPUTER READABLE RECORDING MEDIUM

CROSS-REFERENCE TO RELATED APPLICATIONS

This application claims priority from Korean Patent Application No. 10-2016-0163036 filed on Dec. 1, 2016 in the Korean Intellectual Property Office, the disclosure of which is incorporated herein by reference in its entirety.

BACKGROUND

Field

The present disclosure relates to a display device, a driving method thereof, and a non-transitory computer readable recording medium, and more particularly, to a display device, a driving method thereof, and a non-transitory computer readable recording medium, which can solve the problem of a first line dim.

Description of the Related Art

Recently, LED display devices are composed of a plurality of LED lines, and use a scan driving method for successively driving the respective lines. In general, the LED display devices adopt a top-bottom type (or bottom-up type) that selects and drives the respective lines in the order of arrangements of the lines.

Such a scan driving method has a problem that the time consumed until a first scan line emits light becomes longer than the time consumed for light emission of the remaining scan lines. This problem is called a problem of a first line dim.

Due to such a problem of a first line dim, a loss of light emission time always occurs on the first string of scan lines. Further, the loss of the light emission time is accumulated to cause a part of the screen to be seen in the dark.

SUMMARY

Example embodiments may overcome the above disadvantages and other disadvantages not described above, and provide a display device, a driving method thereof, and a non-transitory computer readable recording medium, which can change a scan line that first emits light for each sub-period.

According to an aspect of an example embodiment, there is provided a display device including: a display including a plurality of light-emitting diode (LED) lines; a scan driver configured to successively supply a power to the plurality of LED lines; and a processor configured to: control the scan driver to successively supply the power to the plurality of LED lines in a repeated manner for each of a plurality of sub-periods that form a scan period; and change a turn-on order of the plurality of LED lines for each of the plurality of sub-periods.

The processor may be further configured to change the turn-on order of the plurality of LED lines to first supply the power to the LED line that is different than one of the plurality of LED lines to which the power was first supplied in a previous sub-period.

The processor may be further configured to change the turn-on order of the plurality of LED lines to first supply the power to the LED line that is different than one of the plurality of LED lines to which the power was last supplied in the previous sub-period.

The processor may be further configured to determine a random power supply order of the LED lines remaining excluding the LED line to which the power is first supplied in the changed turn-on order.

The processor may be further configured to change the turn-on order of the plurality of LED lines to first supply the power to the LED line that is apart for a predetermined number of lines from one of the plurality of LED lines to which the power was first supplied in a previous sub-period.

The processor may be further configured to divide the plurality of LED lines into two regions, and change the turn-on order of the plurality of LED lines to first supply the power to the LED line that belongs to a region from among the two regions that is different from the region to which the power was first supplied in a previous sub-period.

The display device may include a driving integrated circuit (IC) for LED light emission, wherein the processor may be further configured to rearrange an order of video data to correspond to the changed turn-on order and transmit the rearranged order of video data to the driving IC.

The driving IC may include an internal memory configured to store the video data therein, and the processor may be further configured to rearrange the order of the video data in consideration of the changed turn-on order and a type of the internal memory of the driving IC, and transmit the rearranged video data to the driving IC.

The processor may be further configured to change a number of the plurality of sub-periods that form the scan period in accordance with grayscale values being expressed.

According to an aspect of another example embodiment, there is provided a method for driving a display device including a plurality of light-emitting diode (LED) lines, including: successively supplying a power to the plurality of LED lines in one sub-period from among a plurality of sub-periods that form a scan period; changing a turn-on order of the plurality of LED lines so that the turn-on order becomes different from a power supply order of the one sub-period; and successively supplying the power to the plurality of LED lines in a next sub-period from among the plurality of sub-periods in accordance with the changed turn-on order.

The changing may include changing the turn-on order of the plurality of LED lines to first supply the power to the LED line that is different than one of the plurality of LED lines to which the power was first supplied in the one sub-period.

The changing may include changing the turn-on order of the plurality of LED lines to first supply the power to the LED line that is different than one of the plurality of LED lines to which the power was last supplied in the one sub-period.

The changing may include determining a random power supply order of the LED lines remaining excluding the LED line to which the power is first supplied in the changed turn-on order.

The changing may include changing the turn-on order of the plurality of LED lines to first supply the power to the LED line that is apart for a predetermined number of lines from one of the plurality of LED lines to which the power was first supplied in the one sub-period.

The changing may include dividing the plurality of LED lines into two regions; and changing the turn-on order of the plurality of LED lines to first supply the power to the LED line that belongs to a region from among the two regions that is different from the region to which the power was first supplied in the one sub-period.

The method may include rearranging an order of video data to correspond to the changed turn-on order.

According to an aspect of another example embodiment, there is provided a non-transitory computer readable recording medium including a program for executing a method for driving a display device including a plurality of light-emitting diode (LED) lines, the method including: successively supplying a power to the plurality of LED lines in one sub-period from among a plurality of sub-periods that form a scan period; changing a turn-on order of the plurality of LED lines so that the turn-on order becomes different from a power supply order of the one sub-period; and successively supplying the power to the plurality of LED lines in a next sub-period from among the plurality of sub-periods in accordance with the changed turn-on order.

According to various aspects of the present disclosure as described above, the problem of the first line dim can be solved without any hardware change.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects will be more apparent by describing certain example embodiments with reference to the accompanying drawings, in which.

DETAILED DESCRIPTION OF THE EXAMPLE EMBODIMENTS

Hereinafter, example embodiments will be described in detail with reference to the accompanying drawings. In describing the present disclosure, well-known element structures and technologies are not described in detail since they would obscure the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined on the basis of the contents of the whole description of the present disclosure.

The terms "first, second, and so forth" may be used to describe various elements regardless of their order or importance and to discriminate one element from other elements, but are not limited to the corresponding elements. For example, a first element and a second element may indicate different elements regardless of their order or importance. For example, without departing from the scope of the present disclosure, the first element may be called the second element, and the second element may be called the first element in a similar manner. The term "and/or" may include all possible combinations of items that are enumerated together.

The terms used in the description are used to merely describe example embodiments, but are not intended to limit the scope of other example embodiments. In the description, a singular expression may include a plural expression unless specially described. The term "includes" or "has" used in the description represents that features, figures, steps, operations, constituent elements, components, or combinations thereof exist, and thus the term should be understood that existence or addition of one or more other features, figures, steps, operations, constituent elements, components, or combinations thereof are not pre-excluded.

Figure 1:
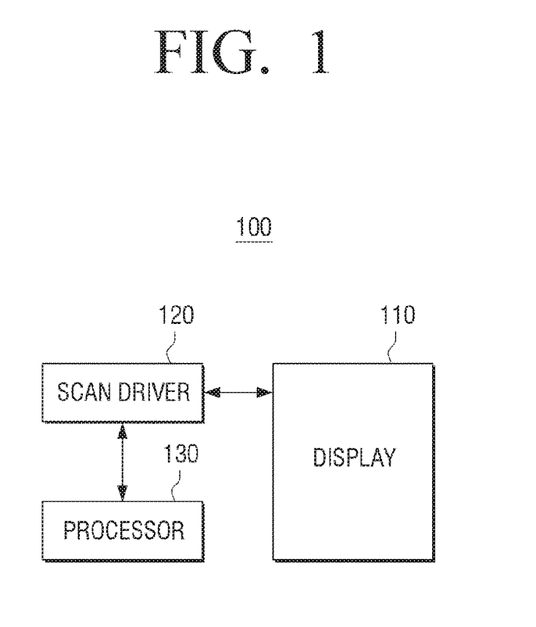
FIG. 1 is a schematic block diagram illustrating a configuration of a display device according to an example embodiment.

FIG. 1 is a schematic block diagram illustrating the configuration of a display device 100 according to an example embodiment. For example, a display device 100 may not use LEDs as a backlight, but may use them to directly express an image.

Referring to FIG. 1, the display device 100 may include a display 110, a scan driver 120, and a processor 130. In an example embodiment of FIG. 1, it is illustrated that the scan driver 120 and the processor 130 are separately configured, but in another example embodiment, the processor 130 may also perform the operation of the scan driver 120.

The display 110 may include a plurality of LED lines. Further, the display 110 may display video frames through the plurality of LED lines. Each of the LED lines may be composed of a plurality of LEDs that express different colors. The display 110 may receive an input of an image signal, and display an image by receiving an input of a driving power for the plurality of LED lines.

The scan driver 120 may successively supply the power to the plurality of LED lines in accordance with a scan signal. The scan signal may be a signal that includes the order of power supply to the plurality of LED lines.

The processor 130 may control the scan driver 120 to successively supply a power to the plurality of LED lines in a repeated manner for each of a plurality of sub-periods that constitute a scan period. Further the processor 130 may change a turn-on order of the plurality of LED lines for each of the sub-periods.

The scan period may mean a period in which one frame of an image is expressed. For example, in the case of a 60 Hz image, one scan period may be about 16.67 ms. The sub-periods may be a plurality of repeated periods that are included in one scan period. For each sub-period, the power is once supplied to the respective LED lines. Accordingly, for one scan period, the power is supplied to the respective LED lines as many as the number of the plurality of sub-periods that constitute the scan period.

Specifically, in this sub-period, the processor 130 may operate to firstly supply the power to the LED line that is different from the LED line to which the power was firstly supplied in the last sub-period. That is, the processor 130 may generate a scan signal so as to change the LED line to which the power is firstly supplied for each sub-period. Through this, the processor 130 can prevent a loss of light emission time from being continuously accumulated on the same LED line.

Further, the processor 130 may change the turn-on order of the LED lines so as to firstly supply the power to the LED line that is different from the LED line to which the power was lastly supplied in the last sub-period. Through this, the processor 130 can prevent the power from being successively provided onto the same LED line twice.

Except for the LED line to which the power is firstly supplied in each sub-period, the processor 130 may supply the power to the remaining LED lines in any order. For example, the processor 130 may generate a scan signal in which the turn-on order of the LED lines is determined to supply the power in order from the LED line to which the power is determined to be firstly supplied to the LED lines that are located below.

As another example, the processor 130 may randomly determine the power supply order of the remaining LED lines excluding the LED line to which the power is determined to be firstly supplied in the changed turn-on order.

As still another example, the processor 130 may determine the power supply order of the remaining LED lines excluding the LED line to which the power is firstly supplied in consideration of an image signal to be transmitted in this scan period.

The processor 130 may determine that the LED line to which the power is to be firstly supplied in this sub-period is apart for a predetermined number of lines or more from the LED line to which the power was firstly supplied in the last sub-period. This is because, if the neighboring LED lines are determined as the LED lines to which the power is firstly supplied in the successive sub-periods, there is a possibility that a region in which the neighboring LED lines are located is expressed in the dark.

The processor 130 may divide the plurality of LED lines into a plurality of regions. For example, the processor 130 may divide the plurality of LED lines into two regions (e.g., an upper-end half and a lower-end half). Further, if the LED line to which the power was firstly supplied in the last sub-period belongs to the first region, the processor 130 may determine the LED line to which the power is to be firstly supplied in this sub-period among the LED lines that belong to the second region.

Figure 2A:
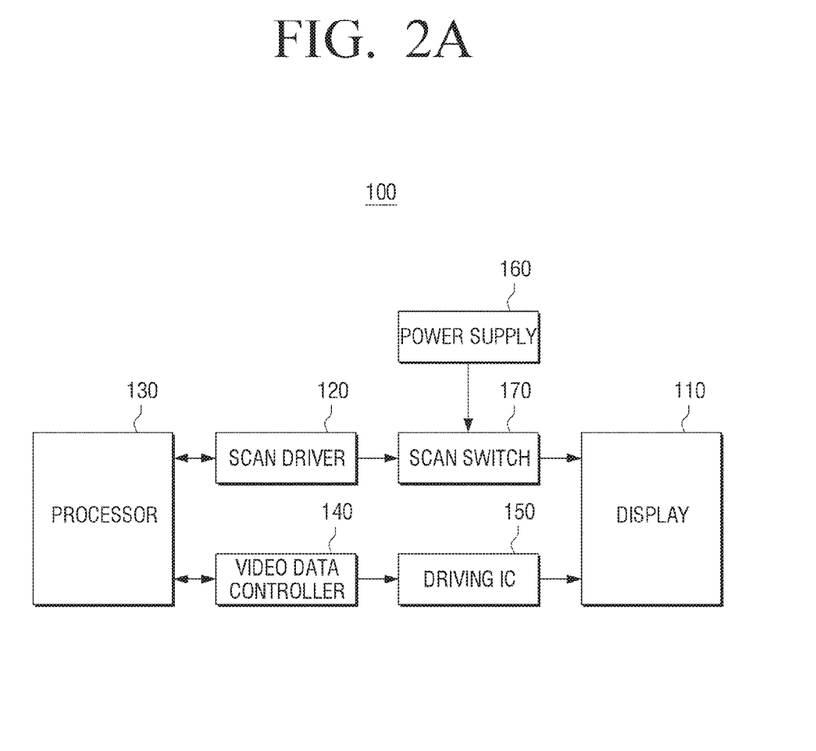
FIGS. 2A and 2B are detailed block diagrams illustrating the configuration of a display device according to one or more example embodiments.
Figure 2B:
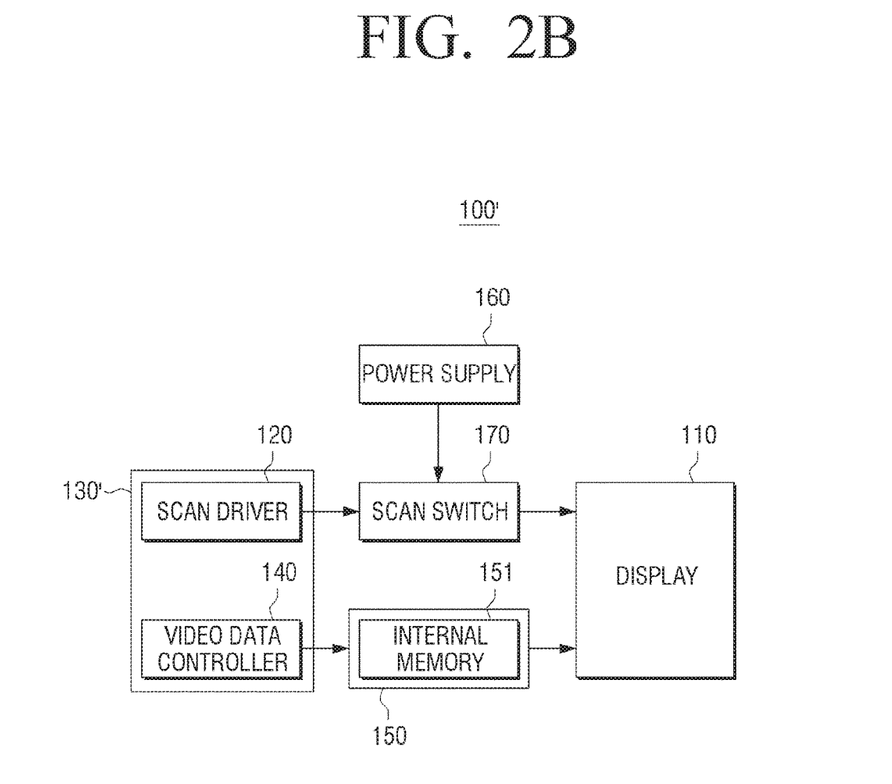

FIGS. 2A and 2B are detailed block diagrams illustrating the configuration of a display device 100 according to various example embodiments. Example embodiments of FIGS. 2A and 2B are different from each other on the points whether a scan driver 120 and a video data controller 140 are configured separately from a processor 130 and whether an internal memory 151 for storing video data therein is included in a driving IC 150. In addition, there is a possibility that the constituent elements are combined in several ways, for example, in a manner that the processor 130 is separately configured as in FIG. 2A and the driving IC 150 is provided with the internal memory 151.

Referring to FIGS. 2A and 2B, a display device 100 may include a display 110, a scan driver 120, a processor 130, a video data controller 140, a driving IC 150, a power supply 160, and a scan switch 170.

The display 110 may display various video content, information, and UIs. The display 110 may include a plurality of LED lines to operate in a scan method.

The scan driver 120 may control the scan switch in accordance with a scan signal that includes timing information for supplying a power to the plurality of LED lines.

The video data controller 140 may manage the video data to be displayed through the display device 100. For example, the video data controller 140 may transmit grayscale information to the scan driver 120 in accordance with R, G, and B for expressing respective video frames.

The processor 130 may control the overall configuration of the display device 100. In particular, the processor 130 may control the operations of the scan driver 120 and the video data controller 140. The processor 130, the scan driver 120, and the video data controller 140 may be implemented by separate chips, or a signal processor may perform all the operations thereof. For example, the processor 130 may be implemented by a CPU (Central Processing Unit), and the video data controller 140 may be implemented by an ISP (Image Signal Processor) or a GPU (Graphic Processing Unit).

The driving IC 150 may control the light emission operations of respective LEDs that are included in the display 110. For example, the driving IC 150 may control respective RGB LEDs to emit light based on the video data received from the video data controller 140. That is, the driving IC 150 may control the light emission operations of the plurality of LEDs that are included in the LED lines to which the power is supplied by the scan driver 120.

For example, under the control of the processor 130, the driving IC 150 may selectively provide constant current to the plurality of LEDs. The driving IC 150 may be composed of a plurality of blocks that take charge of the respective LEDs that express different colors. The driving IC 150 may determine a constant current application time in accordance with duty information of the respective LEDs. The video data controller 140 may generate the duty information that indicates how long the LEDs emit light through analysis of the brightness of an image.

Through the above-described operation, the processor 130 may rearrange the order of the video data so as to correspond to the turn-on order of the plurality of LED lines through the scan driver 120. The driving IC 150 may express the corresponding image to the extent of one LED line by controlling the light emission operations of the plurality of LEDs that are included in the LED line to which the power is supplied in accordance with the rearranged order of the video data. In the case of the driving IC 150 that is implemented not to include the internal memory 151 therein, the processor 130 may transmit the video data of which the order has been rearranged directly to the driving IC 150.

If the driving IC 150 includes the internal memory 151 for storing the video data as shown in an example embodiment of display device 100' illustrated in FIG. 2B, the processor 130' may rearrange the order of the video data in consideration of the type of the internal memory 151 of the driving IC 150 together. The type of the internal memory 150 may be FIFO (First In First Out), FILO (First In Last Out), LIFO (Last In First Out), or LILO (Last In Last Out). For example, the FIFO corresponds to a memory that firstly sends data that firstly comes in. The FIFO may rearrange the video data in the same order as the order of a case where the driving IC 150 does not include the internal memory 151. However, in the case of the FILO or LIFO, an output is made in the order opposite to the order of an input, and thus the processor 130 should rearrange the order of additional video data.

The power supply 160 may supply the power to the plurality of LEDs in the display 110. For example, the power supply 160 may be implemented by an SMPS (Switched-Mode Power Supply). The SMPS may convert a DC input voltage into a voltage of a square wave using a semiconductor device, such as a power MOSFET, as a switch, and then may output a DC output voltage that is controlled through a filter. The SMPS is advantageous in miniaturization and lightweight, and thus is suitable for being used in the display device 100.

The power supply 160 may be connected to one end of each of the plurality of LEDs. Further, the driving IC 150 may be connected to the other end of each of the plurality of LEDs.

The scan switch 170 may turn on/off the power supply for each line in accordance with the scan driving method.

Of course, the display device 100 may be implemented in the form that additionally includes configurations that are not included in the example embodiments of FIGS. 2A and 2B. For example, the display device 100 may include a memory for storing various kinds of programs and data that are necessary for the operation of the display device 100, a communication interface for communication with an outside, a video receiver for receiving video content data through various sources, a video processor for performing various kinds of image processing, such as video data decoding, scaling, noise filtering, frame rate conversion, and resolution conversion, an audio processor for processing audio data, and an audio outputter for outputting not only the audio data that is processed by the audio processor but also various kinds of notification sound or voice messages.

Hereinafter, with reference to the drawings, an LED driving method of a display device 100 will be described in more detail.

Figure 3:
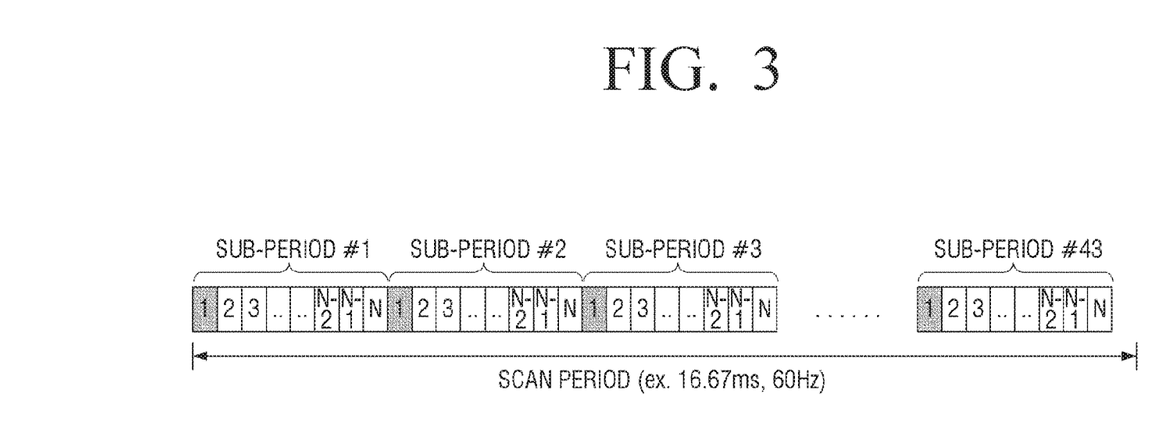
FIG. 3 is a diagram illustrating an LED driving method of a display device.

FIG. 3 is a diagram illustrating an LED driving method of a display device 100.

In an example of FIG. 3, a scan period for expressing one video frame includes a plurality of sub-periods. For example, an LCD display in the related art scans an image signal only once for the plurality of LED lines in one scan period in order to express one video frame. However, the display 100 using LEDs, such as the display device 100, according to an example embodiment may include a plurality of sub-periods for expressing the same video frame in one scan period. Accordingly, an image signal is scanned as many as the same number of as the number of the sub-periods in each of the plurality of LED lines in one scan period.

Referring to FIG. 3, the power is supplied in order from the first LED line to the N-th LED line by the same order in the respective sub-periods. Since the same power supply pattern is provided for each of the sub-periods, the power is firstly supplied to the first LED line.

Unlike an example embodiment of FIG. 3, even if a pattern for alternately supplying the power to upper and lower lines, such as 1→N→2→N-1→3→N-2, the LED line to which the power is firstly supplied still becomes the first line in the same manner.

Figure 4:
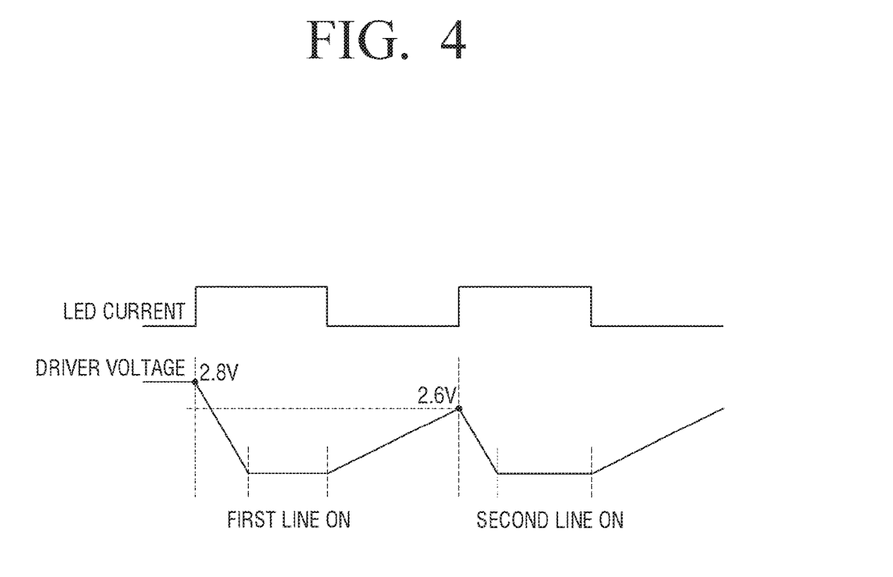
FIG. 4 is a diagram illustrating a cause of a problem of a first line dim.

If the power is firstly supplied to the same LED line in every period, a problem of a first line dim occurs. Referring to FIG. 4, as current is supplied to respective LED lines, a driving voltage is lowered, and if the driving voltage is lowered down to a predetermined voltage, the LED lines are turned on. Further, if the current supply is interrupted, the driving voltage gradually rises again with the lapse of time. If a new period starts after completion of one period, the driving voltage falls after reaching the highest point, and thus the time consumed until the first line is turned on becomes longer than the time consumed until other lines are turned on. Accordingly, a loss of turn-on time always occurs in the first line, and this is called the problem of the first line dim.

In order to solve the problem of the first line dim, the display device 100 according to an example embodiment may change the pattern of the order of power supply for each of the sub-periods. Through dispersion of the first order of each scan period (sub-period) to several LED lines, the display device 100 can prevent a driving loss that occurs due to the problem of the first line dim from being accumulated on a specific LED line.

Figure 5:
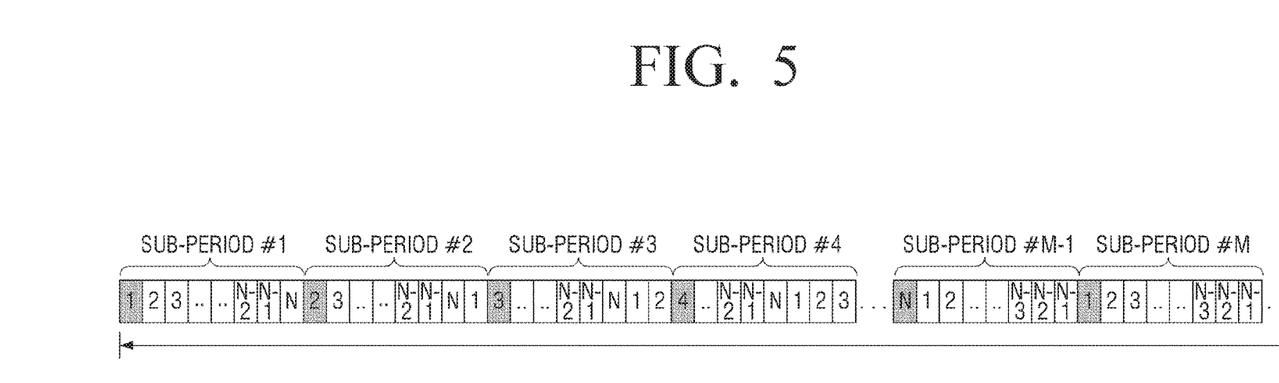
FIGS. 5 to 7 are diagrams illustrating a method for driving a display device according to one or more example embodiments.

According to an example embodiment, the processor 130 may change the LED line to which the power is firstly supplied among the plurality of LED lines for each sub-period. Referring to FIG. 5, the processor 130 may operate to firstly supply the power to the first LED line among N LED lines in sub-period #1, and may operate to firstly supply the power to the second LED line in sub-period #2.

According to an example embodiment of FIG. 5, it is illustrated that each number of the plurality of sub-periods that constitute the scan period coincides with the arrangement number of the LED line to which the power is firstly supplied among the plurality of LED lines. However, this is merely exemplary, and it is enough that a condition, on which the LED line to which the power is firstly supplied is changed in each sub-period, is satisfied.

Further, although it is illustrated in FIG. 5 that "M" and "N" are the same numeral, it is not necessary that the number "M" of sub-periods that constitute one scan period is equal to the number "N" of LED lines. The number "N" of LED lines is determined by the number of LED lines that are arranged by hardware when the display 110 is implemented. Further, the processor 130 may change the number "M" of sub-periods in accordance with the grayscale value to be expressed in the scan period. For example, in the case of expressing a high grayscale value (e.g., gray 255), the processor 130 may increase the number of sub-periods. In contrast, in the case of expressing a low grayscale value (e.g., gray 10), the processor 130 may decrease the number of sub-periods. If the number of sub-periods is small, the scan period may include a pause period in which the power is not supplied to all LED lines.

In order to solve the problem of the first line dim, the display device 100 according to an example embodiment may disperse the LED line to which the power is supplied in the first order to the lines that are not adjacent to the LED line.

In the case of dispersing the first order of each scan period (sub-period) to the adjacent LED lines, a section in the dark may be rather thickened. Accordingly, in order to maximize the dispersion effect, in this sub-period, the processor 130 may change the turn-on order of the LED lines so as to firstly supply the power to the LED line that is apart for a predetermined number of lines or more from the LED line to which the power was firstly supplied in the last sub-period.

Figure 6:
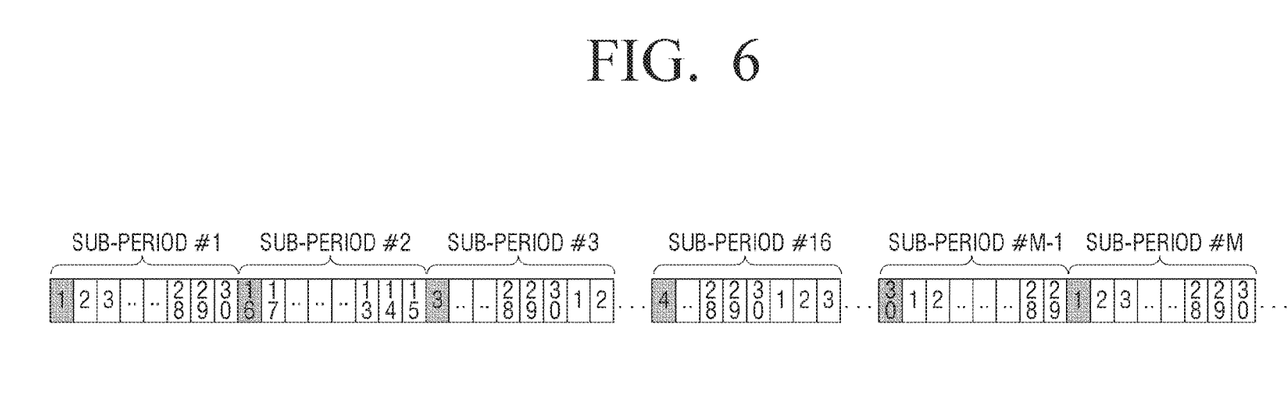

In an example embodiment of FIG. 6, it is assumed that 30 (N=30) LED lines are provided. For example, the processor 130 may divide the plurality of LED lines into two regions. In an example embodiment of FIG. 6, the processor 130 may divide the whole LED lines so that the first to $15^{th}$ LED lines belong to the first region, and the $16^{th}$ to $30^{th}$ LED lines belong to the second region.

Further, the processor 130 may change the turn-on order of the LED lines so as to firstly supply the power in this sub-period to one of the LED lines that belong to the region that is different from the region to which the LED line, to which the power was firstly supplied in the last sub-period, belongs.

Referring to FIG. 6, since the power was firstly supplied to the first LED line that belongs to the first region in sub-period #1, the processor 130 may change the turn-on order of the LED lines so that the power is firstly supplied to the $16^{th}$ LED line that belongs to the second region in sub-region #2. In the same manner, the processor 130 may change the turn-on order of the LED lines so that the power is firstly supplied to the third LED line that belongs to the first region again in sub-region #3.

Figure 7:
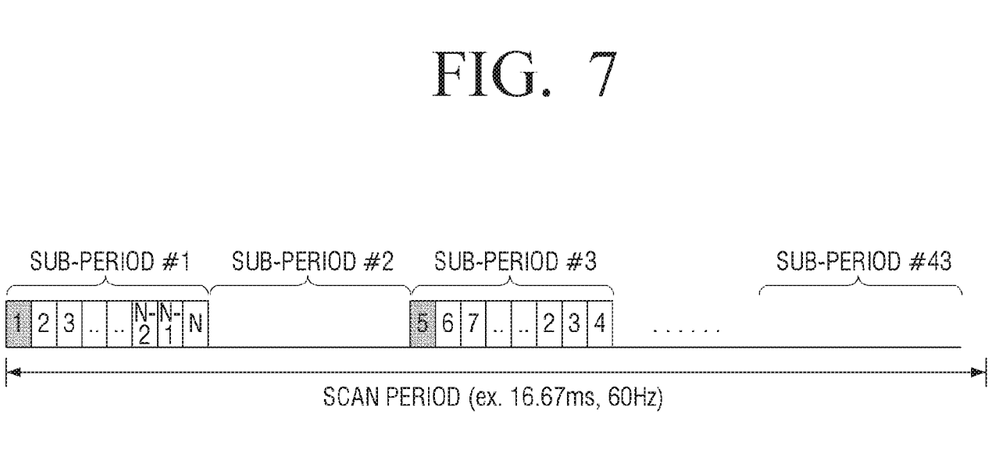

FIG. 7 is a diagram illustrating an example embodiment in which a scan period includes a pause period in order to express low grayscales. In sub-period #1, the power is firstly supplied onto the first LED line. Sub-period #2 corresponds to a pause period in which the power is not supplied to all LED lines. In this case, the processor 130 may change the turn-on order so that the LED lines to which the power is firstly supplied become different from each other in sub-period #1 and sub-period #3 that are successively arranged in a state where the pause period is interposed between them. In an example embodiment of FIG. 7, in sub-period #3, the processor 130 may change the turn-on order so that the power is firstly supplied to the fifth LED line that is different from the first LED line to which the power was firstly supplied in sub-period #1.

According to various example embodiments as described above, by controlling the turn-on order so as to disperse a driving loss to several LED lines, the display device 100 can solve the problem of the first line dim without changing the hardware configuration.

Figure 8:
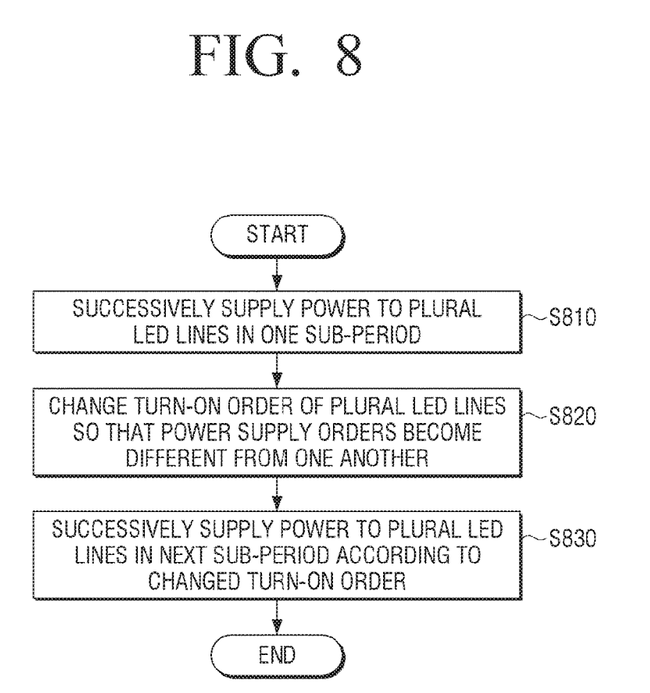
FIG. 8 is a flowchart illustrating a method for driving a display device according to an example embodiment.

FIG. 8 is a flowchart illustrating a method for driving a display device 100 according to an example embodiment.

Referring to FIG. 8, a display device 100 may supply a power to a plurality of LED lines in a specific order in one of a plurality of sub-periods (S810).

Further, the display device 100 may change the turn-on order of the plurality of LED lines in the next sub-period so that the turn-on order becomes different from the power supply order in one sub-period (S820). For example, the display device 100 may change the turn-on order of the LED lines so as to firstly supply the power to the LED line that is different from the LED line to which the power was firstly supplied in the one sub-period. Further, in order to prevent the power from being supplied to the same LED line successively twice, the display device 100 may change the turn-on order of the LED lines so as to firstly supply the power to the LED line that is different from the LED line to which the power was lastly supplied in the one sub-period.

As another example, the display device 100 may change the turn-on order of the LED lines so as to firstly supply the power to the LED line that is apart for a predetermined number of lines or more from the LED line to which the power was firstly supplied in the one sub-period.

In order to maximize the dispersion effect, the display device 100 may divide the plurality of LED lines into two regions (e.g., an upper-end half and a lower-end half). Further, the display device 100 may change the turn-on order of the LED lines so as to firstly supply the power to the LED light that belongs to the region that is different from the region to which the power was firstly supplied in the one sub-period.

For example, the turn-on order of the remaining LED lines excluding the LED line to which the power is firstly supplied may be determined most efficiently in accordance with video data to be expressed. For example, the display device 100 may randomly determine the turn-on order of the remaining LED lines excluding the LED line to which the power is firstly supplied.

Further, the display device 100 may rearrange the order of video data so as to correspond to the changed turn-on order.

The display device 100 may supply the power to the plurality of LED lines in the next sub-period among the plurality of sub-periods that constitute a scan period in accordance with the changed turn-on order.

The above-described methods may be implemented in the form of program instructions that can be performed through various computer means, and may be recorded on a computer readable medium. The computer readable medium may include program instructions, data files, and data structures solely or in combination. The program instructions that are recorded on the medium may be specially designed and configure for the present disclosure, or may be known and available to computer software providers. Examples of the computer readable recording media may include hardware devices specially configured to store and perform program instructions, such as magnetic media, such as a hard disk, a floppy disk, and a magnetic tape, an optical media, such as a CD-ROM and a DVD, a magneto-optical media, such as a floptical disk, a ROM, a RAM, and a flash memory. Examples of the program instructions may include not only machine codes that are made by compilers but also high-class language codes that can be executed by computers using interpreters and the like. The hardware devices may be configured to operate as one or more software modules in order to perform the operation according to the present disclosure, and vice versa.

The foregoing example embodiments and advantages are merely exemplary and are not to be construed as limiting the present disclosure. The present disclosure can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A display device for displaying an image frame during a scan period, the display device comprising:
   a display comprising a plurality of light-emitting diode (LED) lines;
   a scan driver; and
   a processor configured to:
      based on the image frame being received, control the scan driver to supply a power to the plurality of LED lines during a first sub-period among a plurality of sub-periods into which the scan period is divided, and
      control the scan driver to firstly supply, during a second sub-period among the plurality of sub-periods, the power to a LED line that is different than a LED line to which the power is firstly supplied during the first sub-period or a LED line to which the power is lastly supplied during the first sub-period, from among the plurality of LED lines,
   wherein the second sub-period is next to the first sub-period among the plurality of sub-periods.

2. The display device as claimed in claim 1, wherein the processor is further configured to:
   determine a random power supply order for which the power is supplied to remaining except for the LED line to which the power is firstly supplied during the second sub-period, and
   control the scan driver to supply the power to the remaining according to the random power supply order during the second sub-period.

3. The display device as claimed in claim 1, wherein the LED line to which the power is firstly supplied during the second sub-period is apart for a predetermined number of lines from the LED line to which the power is firstly supplied during the first sub-period, from among the plurality of LED lines.

4. The display device as claimed in claim 1, wherein the LED line to which the power is firstly supplied during the second sub-period is included in a region from among two regions, into which the plurality of LED lines are divided, that is different from the other region comprising the LED line to which the power is firstly supplied during the first sub-period.

5. The display device as claimed in claim 1, wherein the processor is further configured to change a number of the plurality of sub-periods based on grayscale values of the image frame.

6. The display device as claimed in claim 1, the display device further comprising a driving integrated circuit (IC) for LED light emission,
wherein the processor is further configured to:
rearrange an order of video data to correspond to a turn-on order for which the power is supplied to the plurality of LED lines during each of the plurality of sub-periods, and
transmit the rearranged order of video data to the driving IC.

7. The display device as claimed in claim 6, wherein the driving IC comprises an internal memory configured to store the video data therein, and
the processor is further configured to:
rearrange the order of the video data based on the turn-on order and a type of the internal memory of the driving IC, and
transmit the rearranged video data to the driving IC.

8. A method for displaying an image frame during a scan period by driving a display device comprising a plurality of light-emitting diode (LED) lines, the method comprising:
based on the image frame being received, supplying a power to the plurality of LED lines during a first sub-period among a plurality of sub-periods into which the scan period is divided;
and
firstly supplying, during a second sub-period among the plurality of sub-periods, the power to a LED line that is different than a LED line to which the power is firstly supplied in the first sub-period or a LED line to which the power is lastly supplied in the first sub-period, from among the plurality of LED lines,
wherein the second sub-period is next to the first sub-period among the plurality of sub-periods.

9. The method as claimed in claim 8, the method further comprising:
determining a random power supply order for which the power is supplied to remaining except for the LED line to which the power is firstly supplied during the second sub-period; and
supplying the power to the remaining according to the random power supply order during the second sub-period.

10. The method as claimed in claim 8, wherein the LED line to which the power is firstly supplied during the second sub-period is apart for a predetermined number of lines from the LED line to which the power is firstly supplied during the first sub-period, from among the plurality of LED lines.

11. The method as claimed in claim 8, wherein the LED line to which the power is firstly supplied during the second sub-period is included in a region from among two regions, into which the plurality of LEI) lines are divided, that is different from the other region comprising the LED line to which the power is firstly supplied during the first sub-period.

12. The method as claimed in claim 8, the method further comprising rearranging an order of video data to correspond to a turn-on order for which the power is supplied to the plurality of LED lines during each of the plurality of sub-periods.

13. A non-transitory computer readable recording medium comprising a program for executing a method for displaying an image frame during a scan period by driving a display device comprising a plurality of light-emitting diode (LED) lines, the method comprising:
based on the image frame being received, supplying a power to the plurality of LED lines during a first sub-period among a plurality of sub-periods into which the scan period is divided;
and
firstly supplying, during a second sub-period among the plurality of sub-periods, the power to a LED line that is different than a LED line to which the power is firstly supplied in the first sub-period or a LED line to which the power is lastly supplied in the first sub-period, from among the plurality of LED lines.

* * * * *